Figure 1:
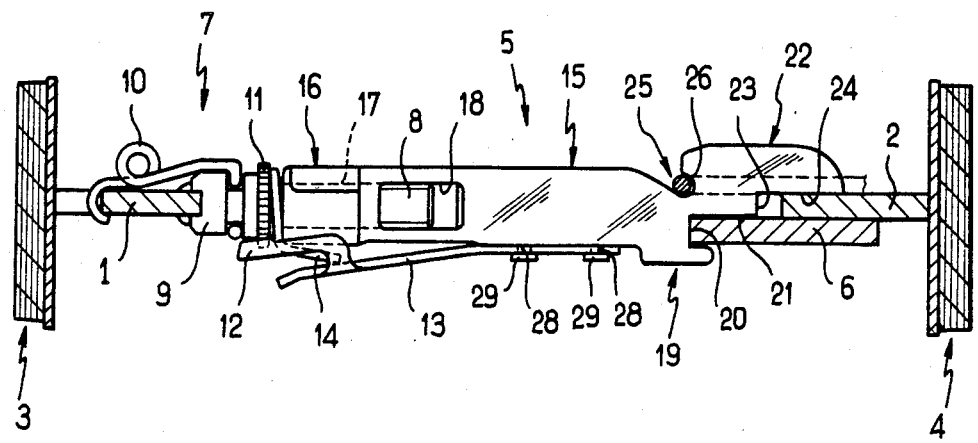

United States Patent [19]

Denree et al.

[11] Patent Number: 4,646,881
[45] Date of Patent: Mar. 3, 1987

[54] AUTOMATIC ADJUSTMENT STRUT FOR A DRUM BRAKE

[75] Inventors: Michel Denree, Aulnay-sous-Bois; Robert Fidanza, Le Blanc Mesnil, both of France

[73] Assignee: Bendix France, Paris, France

[21] Appl. No.: 777,469

[22] Filed: Sep. 18, 1985

[30] Foreign Application Priority Data

Sep. 19, 1984 [FR] France .............................. 84 14331

[51] Int. Cl.⁴ ............................................. F16D 65/66
[52] U.S. Cl. ............................ 188/79.5 P; 188/79.5 B; 188/196 BA
[58] Field of Search ............ 188/79.5, 196, 71.8–71.9, 188/325, 331, 1.11; 192/111 A; 411/514

[56] References Cited

U.S. PATENT DOCUMENTS

| | | | |
|---|---|---|---|
| 4,148,380 | 4/1979 | Haraikawa | 188/79.5 B |
| 4,217,973 | 8/1980 | Johns et al. | 188/79.5 P |
| 4,220,227 | 9/1980 | Kluger | 188/196 BA |
| 4,236,611 | 12/1980 | Claverie | 188/79.5 P |
| 4,243,124 | 1/1981 | Kluger | 188/79.5 P |
| 4,503,949 | 3/1985 | Carré et al. | 188/79.5 P |

FOREIGN PATENT DOCUMENTS

| | | |
|---|---|---|
| 077726 | 4/1983 | European Pat. Off. . |
| 0104102 | 3/1984 | European Pat. Off. . |
| 2508614 | 8/1975 | Fed. Rep. of Germany . |
| 2951473 | 7/1980 | Fed. Rep. of Germany . |
| 2224673 | 10/1974 | France . |

*Primary Examiner*—Douglas C. Butler
*Attorney, Agent, or Firm*—Larry J. Palguta; Ken C. Decker

[57] ABSTRACT

The strut body (5) is made as a single piece by casting and incorporates a main elongated portion (15), an enlarged end forming a head (16) through which a bore (17) passes, which is partially closed peripherally (18) and which extends into the main portion so as to house the screw of an associated screw and nut system, one end forming a hook (19) and at least one protuberance (28) projecting relative to an outside surface which is essentially flat (27) so as to allow an elastic leaf to be mounted on the body (5) by crimping, the elastic leaf carrying a ratchet cooperating with the external teeth of a nut of the screw and nut system.

8 Claims, 2 Drawing Figures

U.S. Patent     Mar. 3, 1987     4,646,881

AUTOMATIC ADJUSTMENT STRUT FOR A DRUM BRAKE

The present invention concerns automatic adjustment devices intended to compensate automatically for the wear of the friction linings of the brake shoes of drum brakes and, more particularly, an automatic adjustment strut for a drum brake, intended to be mounted between two brake shoes, the strut incorporating a strut body made of metal and a screw and nut system the screw of which is housed in a housing in the strut body and the nut of which cooperates selectively with a ratchet which is firmly fixed to an elastic leaf mounted on the strut body.

A strut of this type is described in the document No. EP-A-0,077,726, in the name of the Applicant Company, whose contents are assumed to be attached herewith for reference.

The strut bodies of automatic adjustment devices for drum brakes are generally made from a tube which is rolled and then forged, and generally stamped and machined, this group of operations resulting in relatively high manufacturing costs and also the rejection of a substantial number of components. In addition, in the type of strut being considered, the mounting of the elastic leaf carrying the ratchet, on the strut body, also represents some difficulty and increases further the manufacturing costs of the unit.

The object of the present invention is to propose a automatic adjustment strut of the type defined above, of simple construction and low cost, suitable for mass production and facilitating the mounting of the elastic leaf carrying the ratchet which cooperates with the nut of the screw and nut system.

To achieve this, according to a characteristic of the invention, the strut body is made as a single piece by casting and incorporates at least one protuberance projecting relative to an outside surface which is essentially fast, the protuberance being intended to enter a hole in the elastic leaf for mounting the leaf on the strut body by crimping the said protuberance.

The manufacturing costs of strut bodies made from a tube which is forged and shaped are further increased when it is necessary to provide, on the strut body, means for attaching a spring intended to push the strut body towards the web of the corresponding brake shoe.

According to another characteristic of the invention, the strut body incorporates, in the region of its opposite end from that which is enlarged forming a head and which defines internally a portion of the housing for the screw of the screw and nut system, an extended leg joined to the main elongated portion of the strut body by a zone forming a hook for attaching a spring intended to be associated with the adjacent brake shoe.

Figure 2:
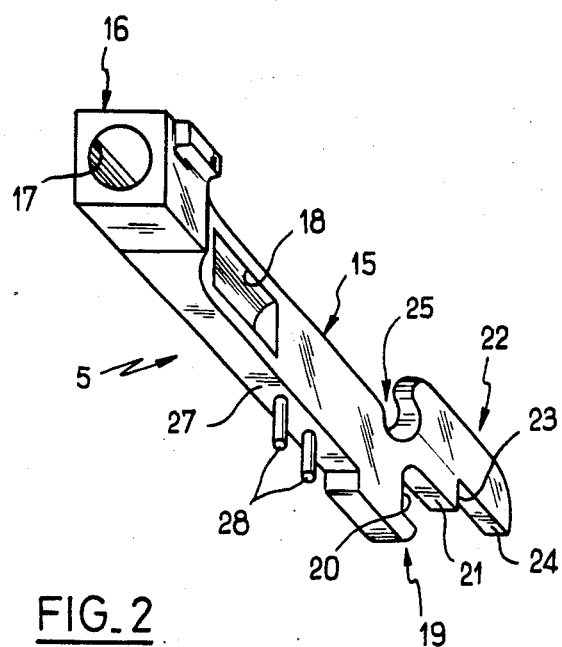

Other characteristics and advantages of the present invention will emerge from the following description of an embodiment, given by way of illustration but not limiting in any way, with reference to the accompanying drawings in which:

FIG. 1 is a diagrammatic view of the arrangement of an automatic adjustment device for a drum brake incorporating a strut body according to the invention; and FIG. 2 is a perspective view of the strut body shown in FIG. 1.

As shown in FIG. 1, and according to the information in the document No. EP-A-077,726 mentioned above, an automatic adjustment strut is shown positioned so as to bear at each of its ends against the webs 1 and 2 of two brake shoes 3 and 4, respectively, of a drum brake for a motor vehicle, the automatic adjustment strut being positioned typically in the region of the actuating means (not shown) also positioned between the two brake shoes 3 and 4 so as to push the latter away from one another into frictional engagement against a rotating brake drum (also not shown). The automatic adjustment strut generally incorporates a strut body 5, intended to cooperate at one of its ends with the web 2 of the brake shoe 4 and, typically, with a lever 6 for the hand brake of the drum brake, and a screw and nut system 7 intended to cooperate, at one of its ends, with the web 1 of the other brake shoe 3. The screw and nut system 7 incorporates a screw 8 provided with a head 9 held in engagement, by a spring 10, with the web 1 of the brake shoe 3, and a nut 11 engaged on the screw 8 and carrying a set of external teeth intended to cooperated selectively with a ratchet 12 firmly fixed to an elastic leaf 13 mounted on the strut body 5. As will be seen below, the ratchet 12 is normally held away from the teeth of the nut 11 by a tilting component or adjustment crank 14 engaged freely on the screw 8 and positioned between the nut 11 and the adjacent flat end surface of the strut body 5, as described in the document No. EP-A-0,077,726 mentioned above.

In accordance with the invention, the strut body 5 has a solid configuration and is made as a single piece by casting, without further machining, from a metal alloy which is ductile and has a low melting point, typically from cast bronze. As shown clearly in FIG. 2, the strut body 5 incorporates a main elongated portion in the form of a beam 15 whose section is essentially in the shape of a parallelepiped and which terminates at one end in an enlarged head 16 whose section is essentially square, and through which a bore 17 passes longitudinally, the bore 17 extending into the main portion 15 beyond the headed end 16, as a cylindrical portion 17 of the same diameter, partially closed peripherally, that is to say having an open lateral portion resulting from the difference in thickness between the main portion 15 and the headed end 16. At the opposite end from the headed end 16, the main elongated portion 15 terminates at its lower portion (shown in the drawings) in a portion forming a hook 19 intended to accept the edge of the hand brake lever 16 and defining for the latter a bottom forming an abutment 20 and a lateral bearing surface 21. The main elongated portion 15 terminates at its upper portion (shown in the drawings) in an extended leg 22 joined to the surface 21 of the portion forming a hook 19 by a shoulder 23, forming a longitudinal contact surface 24 for an adjacent surface of the web 2 of the corresponding brake shoe 4. In addition, the extended leg 22 is joined to the upper portion of the main elongated portion 15 by a zone forming a hook 25 intended to accept a leg of a spring 26 attached elsewhere to the web 2 of the brake shoe 4 so as to push the latter towards the shoulder 23.

According to a characteristic of the invention, the lower surface 27 (shown in the drawings) of the main elongated portion 15 of the strut body 5 is essentially flat and incorporates one, or typically two, pegs 28 projecting perpendicularly outwards from this surface 27, in the region of the portion forming a hook 19, and intended to enter corresponding holes 29 in the elastic leaf 13, the pegs 28 being formed directly by casing with the strut body 5. In this way, the leaf 13 may be mounted very quickly and with great precision on the strut body 5 by simple crimping of the ends of the pegs 28, possibly with the application of heat as shown in FIG. 1. The strut body 5 may be made by casting as a single piece with great precision particularly as regards the housing 17, 18 which is intended to house the screw 8 of the screw and nut system 7 without requiring further machining, this also enabling perfect reproducibility on a large scale and allowing, particularly as far as the extended leg portion 22 is concerned, a wide variety of shapes and dimensions to suit different types of drum brake and methods of attaching the springs 26.

The general method of operation of the automatic adjustment device shown in FIG. 1 is recalled as follows. At rest, the spring (not shown) which pushes the shoes 3 and 4 towards one another pushes the strut body 5 and the screw and nut system 7 towards one another thus holding the ring of the adjustment crank 14 bearing against the flat end surface of the head 16 of the strut body 5 and also against the adjacent nut 11. In this way, the arm of the adjustment crank 14 disengages the elastic leaf 13 from the surface 27 of the strut body 5, and therefore disengages the ratchet 12 (firmly fixed to the leaf 13 or formed as a single piece with the latter) from the teeth of the nut 11. When the means for actuating the brake are put into operation, the shoes 3 and 4 are pushed away from one another, thus tending to separate the strut body 5 and the screw and nut system 7 from one another, which allows the ring of the adjustment crank 14 to recover an inclined position relative to the screw 8 on which it is mounted and thus allows the elastic leaf 13 to move elastically towards the surface 27 of the strut body 5 bringing the ratchet 12 into engagement with the teeth of the nut 11 and tending to cause the latter to turn relative to the screw 8 until the leaf 13 assumes its rest configuration relative to the strut body 5. When braking is released, the two shoes 3 and 4 move towards one another again thus tending to compress the strut, which causes the ring of the adjustment crank 14 to tilt once again so as to disengage the ratchet 12 from the teeth of the nut 11.

Although the present invention has been described in relation to a particular embodiment, it is not limited by that embodiment, but on the contrary is capable of modifications and variants which will be apparent to a person versed in the art.

What is claimed is:

1. An automatic adjustment strut, intended to be mounted between two brake shoes of a drum brake, comprising a metal strut body supporting a screw and nut system including a screw and nut, the screw housed in a recess in the strut body and the nut cooperating selectively with a ratchet member carried by an elastic leaf mounted on the strut body, characterized in that the strut body is made as a single piece by casting and includes an elongated main portion whose section is essentially in the shape of a parallelopiped, and an end portion in the form of an enlarged head whose section is essentially square, the recess for the screw including a peripherally closed bore portion passing through the head and extending into an open lateral portion in the main portion of the strut body, the open lateral portion resulting from a difference in thickness between the main portion and head, and the elastic leaf secured to the main portion.

2. The strut according to claim 1, characterized in that the strut body comprises, at an end opposite the head, a portion forming a first hook intended to receive an edge of a brake lever of the drum brake.

3. The strut according to claim 2, characterized in that the end opposite the head is formed by an extended leg joined by a shoulder to the portion forming the first hook and forming a contact surface for a surface of a web of an adjacent brake shoe.

4. The strut according to claim 3, characterized in that the extended leg is joined to the elongated main portion by a zone forming a second hook for attaching a spring associated with the adjacent brake shoe.

5. The strut according to claim 1, wherein the strut body comprises at least one integrally formed protuberance projecting relative to a substantially flat surface of the main portion, the protuberance extending into a hole in the elastic leaf for mounting the elastic leaf on the strut body by crimping said protuberance.

6. The strut according to claim 5, characterized in that the strut body comprises two protuberances associated with the main portion.

7. The strut according to claim 6, characterized in that the strut body is made of bronze.

8. The strut according to claim 1, characterized in that the strut body is made of an alloy with a low melting point.

* * * * *